No. 619,440. Patented Feb. 14, 1899.
J. H. ROBERTSON.
DUPLEX FARADIC BATTERY.
(Application filed Apr. 9, 1898.)
(No Model.)
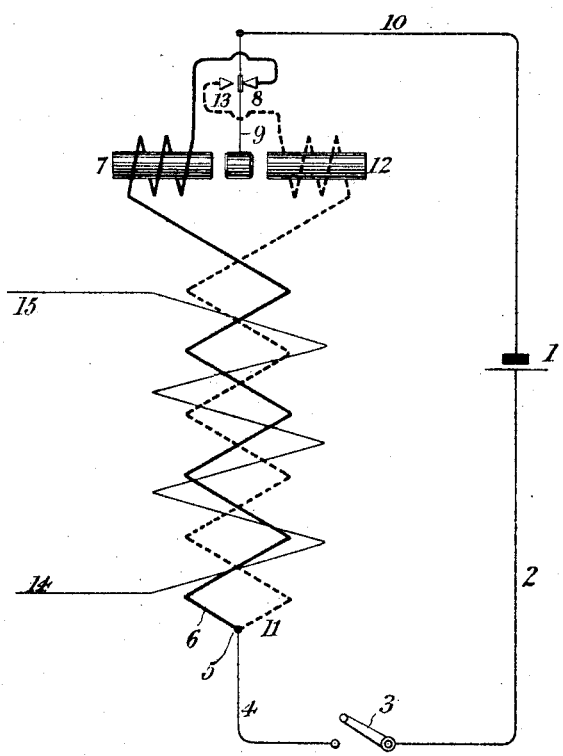
Witnesses:
Raphaël Netter
James R. Catlow
Inventor:
James Hart Robertson

UNITED STATES PATENT OFFICE.

JAMES HART ROBERTSON, OF NEW YORK, N. Y.

DUPLEX FARADIC BATTERY.

SPECIFICATION forming part of Letters Patent No. 619,440, dated February 14, 1899.

Application filed April 9, 1898. Serial No. 676,994. (No model.)

*To all whom it may concern:*

Be it known that I, JAMES HART ROBERTSON, a citizen of the United States, and a resident of 1287 Fulton street, borough of Brooklyn, New York, Kings county, State of New York, have invented a new and useful Improvement in Duplex Faradic Batteries, of which the following is a specification.

In ordinary faradic batteries impulses are induced in the secondary circuit of an induction-coil by means of automatically making and breaking the continuity of a current passing in one direction around the core, which core generally consists of a mass of finely-divided iron, but may be of any material around which a conductor can be wound. A battery of this kind gives a "one-sided" current—that is, a current which is stronger at one terminal of the secondary wire than at the other—the result being that a much less induced current can be passed through a person without causing pain or disagreeable sensations than if the current had the same physiological effect at both terminals.

The object of the present invention is to obtain the same effect at both secondary terminals, which is done by means of a duplex method of wiring the primary coil and automatically commutating the current, so as to alternately change its direction around the core, thereby causing the impulses at either end of the secondary wire to be approximately even. The result is obtained by differentially winding the primary wires, two of which are used, each one being wound in a direction opposite to that of the other. Two of the ends are then connected with each other and also with one pole of the battery. Each of the other ends is connected to one of two electromagnets, then to standards carrying adjustable platinum-pointed screws on either side of a vibrator, which is connected with the opposite pole of the battery, to which the jointed ends of wire on the differentially-wound coil before mentioned are attached. The vibrator has on one end an iron armature, which preferably vibrates between the poles of two electromagnets. Normally the vibrator rests against the platinum point on one side, and the point on the other side is as close as possible without absolutely touching it. When the current is applied, the vibrator is pulled away from the first contact-point by the electromagnet on the opposite side to the terminal to which it is connected. Before the vibrator is pulled away a current has passed through one of the primary wires of the induction-coil in one direction, and the instant the vibrator makes contact with the second point a current passes through the other primary wire in the opposite direction. The action continues as long as the circuit is closed.

The accompanying drawing is a diagrammatic representation of the circuits and connections.

1 is the battery; 2, wire connected to battery and switch; 3, switch; 4, wire connected to primary wires at junction 5; 5, junction of primary wires with wire 4; 6, primary wire; 7, electromagnet in circuit with primary wire 6; 8, contact-point connected to terminal of electromagnet 7; 9, vibrator; 10, wire from battery connected to vibrator; 11, primary wire shown in dotted lines wound in the opposite direction to that of other primary wire 6; 12 electromagnet in circuit with primary wire 11; 13, contact-point connected to terminal of electromagnet 12; 14 and 15, terminals of secondary wire of induction-coil.

When switch 3 is closed, the current will pass from battery 1 and back by way of wire 2, switch 3, wire 4, junction 5, primary wire 6, electromagnet 7, contact-point 8, vibrator 9, and wire 10. When the vibrator is drawn away from point 8 and into contact with point 13, the circuit will then be from battery and back by way of wire 2, switch 3, wire 4, junction 5, primary wire 11, electromagnet 12, contact-point 13, vibrator 9, and wire 10.

Having described my invention, what I desire to claim is—

1. In a faradic battery, an induction-coil differentially wound, in combination with an armature influenced by two electromagnets, and adapted to make alternate contact with two points, each of which said two points is in circuit, at intervals, with an electromagnet and a primary wire of an induction-coil, substantially as described.

2. The method of equalizing secondary impulses in a faradic battery by alternately charging and discharging electromagnets in circuit with the primary wires of an induction-coil and on opposite sides of an armature, substantially as described.

3. The method of equalizing currents in a faradic battery, by attracting an armature in one direction, toward an electromagnet in circuit with a primary wire on an induction-coil, and then attracting it in the opposite direction, toward a second electromagnet in circuit with a second primary wire on an induction-coil, substantially as described.

4. In a faradic battery, an armature connected, flexibly, with one pole of a battery and adapted to complete the circuit, at intervals, with the other pole by way of either of two stationary contacts, either of two electromagnets and either of two primary wires of an induction-coil, substantially as described.

5. In a faradic battery, an armature adapted to be attracted first by one and then by the other of two electromagnets, each of which is in circuit, at intervals, with a contact-point, on the opposite side of the armature, a primary wire of an induction-coil and a battery, substantially as described.

6. In a faradic battery two branches through one induction-coil, each branch being connected to a separate electromagnet which is only charged when a current is passing through its corresponding branch, substantially as described.

7. The method of equalizing secondary currents by successively energizing, by means of intermittent primary currents, two (2) electromagnets alternately in circuit with an induction-coil, an armature and a battery, substantially as described.

8. The combination of a battery, an induction-coil, two primary wires, two electromagnets and two stationary contact-points, with an armature adapted to vibrate between said two electromagnets and also between said two contact-points, substantially as described.

In testimony that I claim the foregoing as my invention I have signed my name, in presence of two witnesses, this 8th day of April, 1898.

JAMES HART ROBERTSON.

Witnesses:
JOHN BARR,
CHARLES R. ALBRECHT.